United States Patent
Feifel et al.

(10) Patent No.: US 11,753,048 B2
(45) Date of Patent: Sep. 12, 2023

(54) MONITORING OF NEURAL-NETWORK-BASED DRIVING FUNCTIONS

(71) Applicant: Continental Teves AG & Co. OHG, Frankfurt am Main (DE)

(72) Inventors: Harald Feifel, Darmstadt (DE); Michael Wagner, Frankfurt a.M. (DE); Sighard Schraebler, Karben (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 340 days.

(21) Appl. No.: 17/276,929

(22) PCT Filed: Dec. 13, 2019

(86) PCT No.: PCT/DE2019/200146
§ 371 (c)(1),
(2) Date: Mar. 17, 2021

(87) PCT Pub. No.: WO2020/125875
PCT Pub. Date: Jun. 25, 2020

(65) Prior Publication Data
US 2022/0032965 A1 Feb. 3, 2022

(30) Foreign Application Priority Data

Dec. 21, 2018 (DE) ..................... 10 2018 222 720.9

(51) Int. Cl.
*B60W 60/00* (2020.01)
*B60W 50/14* (2020.01)
(Continued)

(52) U.S. Cl.
CPC ........ *B60W 60/0059* (2020.02); *B60W 30/09* (2013.01); *B60W 30/095* (2013.01);
(Continued)

(58) Field of Classification Search
CPC ......... B60W 60/0059; B60W 60/0053; B60W 30/09; B60W 30/095; B60W 50/14;
(Continued)

(56) References Cited

U.S. PATENT DOCUMENTS

| 11,249,191 B2 * | 2/2022 | Bravo Orellana .... G01S 17/931 |
| 2012/0143808 A1 * | 6/2012 | Karins ..................... G06N 7/01 |
| | | 706/46 |

(Continued)

FOREIGN PATENT DOCUMENTS

| DE | 102017214611 | 2/2019 |
| WO | WO 2017/155598 | 9/2017 |

(Continued)

OTHER PUBLICATIONS

Tai-En et al., "LiDAR/camera Sensor Fusion Technology for Pedestrian Detection," 2017, Publisher: IEEE.*

(Continued)

*Primary Examiner* — Tuan C To

(57) ABSTRACT

The invention relates to a control system for controlling a brake, a steering and/or a drive of an autonomous or automated vehicle. This involves an artificial-intelligence-based first control apparatus being monitored by virtue of a criticality of a driving situation being determined on the basis of simple calculation values, wherein a specific criticality of the driving situation, or an inappropriate reaction by the first control apparatus to the driving situation, can result in changeover to a second control apparatus that undertakes the control of the vehicle on the basis of a deterministic calculation rule.

11 Claims, 2 Drawing Sheets

(51) Int. Cl.
    *B60W 30/09*     (2012.01)
    *B60W 30/095*     (2012.01)
    *G06N 3/02*     (2006.01)
    *G06N 5/00*     (2023.01)
    *G06N 5/01*     (2023.01)

(52) U.S. Cl.
    CPC ........ *B60W 50/14* (2013.01); *B60W 60/0053* (2020.02); *G06N 3/02* (2013.01); *G06N 5/01* (2023.01); *B60W 2420/42* (2013.01); *B60W 2420/52* (2013.01); *B60W 2420/54* (2013.01); *B60W 2556/45* (2020.02); *B60W 2710/18* (2013.01); *B60W 2710/20* (2013.01)

(58) Field of Classification Search
    CPC ......... B60W 2556/45; B60W 2420/42; B60W 2420/52; B60W 2420/54; B60W 2710/18; B60W 2710/20; G06N 3/02
    USPC .......................................................... 701/301
    See application file for complete search history.

(56) References Cited

U.S. PATENT DOCUMENTS

| | | | | |
|---|---|---|---|---|
| 2017/0308075 | A1* | 10/2017 | Whitaker | B60W 10/18 |
| 2017/0349178 | A1* | 12/2017 | Suzuki | B60W 30/162 |
| 2018/0275657 | A1 | 9/2018 | You | |
| 2018/0370503 | A1* | 12/2018 | Graney | B60W 30/00 |
| 2019/0107401 | A1* | 4/2019 | Schmidt | B60S 1/481 |
| 2019/0270408 | A1* | 9/2019 | Castro | B60Q 9/00 |
| 2019/0370114 | A1* | 12/2019 | Troia | G06F 21/575 |
| 2020/0031340 | A1* | 1/2020 | Tao | B60W 30/146 |
| 2020/0033869 | A1* | 1/2020 | Palanisamy | B60W 40/10 |
| 2020/0174486 | A1* | 6/2020 | Luo | G05D 1/0088 |
| 2021/0026348 | A1* | 1/2021 | Gogna | G05D 1/0088 |

FOREIGN PATENT DOCUMENTS

| | | | | |
|---|---|---|---|---|
| WO | WO-2018175808 | A1 * | 9/2018 | B60W 50/023 |
| WO | WO-2018191134 | A1 * | 10/2018 | A01G 15/00 |
| WO | WO-2018193449 | A1 * | 10/2018 | B60W 50/02 |

OTHER PUBLICATIONS

English translation of the International Search Report of the International Searching Authority for International Application PCT/DE2019/200146, dated May 19, 2020, 2 pages, European Patent Office, HV Rijswijk, Netherlands.

PCT International Preliminary Report on Patentability including English Translation of PCT Written Opinion of the International Searching Authority for International Application PCT/DE2019/200146, dated Jun. 16, 2021, 8 pages, International Bureau of WIPO, Geneva, Switzerland.

German Office Action dated Nov. 15, 2019 in German Patent Application No. 10 2018 222 720.9, 6 pages, with English partial translation, 3 pages.

* cited by examiner

MONITORING OF NEURAL-NETWORK-BASED DRIVING FUNCTIONS

TECHNICAL FIELD

The invention relates to a control system for controlling an autonomous or automated vehicle, and to a method and a computer program.

BACKGROUND TO THE INVENTION

During the control of autonomous or automated vehicles, the recognition of a driving situation is increasingly undertaken by artificial intelligence. Likewise, it is therefore decided whether and with which action the driving situation is to be reacted to, on the basis of decisions by artificial intelligence. Neural networks, which are trained based on data from genuine driving situations with the related decision to be made, are frequently used for this purpose. A disadvantage of using artificial intelligences in road traffic is, however, the fact that it is not possible or not easily possible to comprehend a decision made by the artificial intelligence. This constitutes a non-deterministic system, in which it cannot be stipulated with certainty, based on the input data, which decision will be made. In the event of an error, in particular if the automatically controlled vehicle is involved in an accident, it is consequently not possible to reconstruct the circumstances of the accident or a possible malfunction of the autonomous or automated vehicle. This has legal consequences since, in particular in the case of serious accidents, the question of fault obviously has to be clarified in liability and warranty terms.

SUMMARY OF THE INVENTION

It is therefore an object of the invention to indicate an improved control system for controlling an autonomous or automated vehicle.

The object is achieved by the subject-matter of the independent claims. Advantageous embodiments are the subject-matter of the dependent claims, the following description as well as the figures.

The described embodiments apply equally to the control system for controlling a brake, a steering and/or a drive of an autonomous or automated vehicle, to the method for controlling a brake, a steering and/or a drive of an autonomous or automated vehicle, to the computer program and to the computer-readable medium. Synergetic effects can arise from different combinations of the embodiments, even if they are not described in detail.

Furthermore, it should be pointed out that all the embodiments of the present invention relating to a method can be executed in the described order of the steps. Nevertheless, this does not have to be the only possible or the necessary order of the steps of the method. The methods described herein can be executed in a different order of the disclosed steps, without deviating from the corresponding embodiment of the method, unless otherwise expressly indicated below.

According to a first aspect of the invention, a control system for controlling a brake, a steering and/or a drive of an autonomous or automated vehicle is indicated. The control system has a detection apparatus which is configured to detect an object from the surroundings of the vehicle and to provide corresponding object data. Furthermore, the control system has an artificial intelligence module which is configured to produce at least one first control command for the vehicle from the object data, as well as a fallback apparatus which is configured to produce at least one second control command for the vehicle from the object data with the aid of a deterministic calculation rule. The control system additionally has a safety apparatus which is configured to establish calculation values on the basis of the object data and to calculate a criticality value therefrom, as well as a safety gate which is configured to receive the first control command of the artificial intelligence module, the second control command of the fallback apparatus and the criticality value of the safety apparatus. Furthermore, the safety gate is configured to send a third control command to the vehicle on the basis of the criticality value, wherein the third control command is either the first control command of the artificial intelligence module or the second control command of the fallback apparatus or corresponds thereto.

In the case of a control system according to the invention for an autonomous or automated vehicle, the object data which are acquired by sensors for monitoring the surroundings of the vehicle are forwarded to at least three subunits. The first subunit is a unit for the automated control of the vehicle. It analyzes the object data and makes its decisions regarding the driving actions to be prompted on the basis of artificial intelligence.

The second subunit is likewise a unit for the automated control of the vehicle, although the driving actions prompted by it are based on a deterministically programmed algorithm, in which it is precisely predefined for which input values which output values are to be output. The third subunit likewise analyzes the object data, although only in terms of calculation values which can be attained simply. A criticality value is calculated from said calculation values, which indicates a measure of an accident probability of the current driving situation. The respective output values of the three subunits, that is to say in particular the first as well as the second control command for brake, steering and/or drive of the vehicle of the first or the second subunit, as well as the criticality value of the third subunit, are transferred to a safety gate. The safety gate processes the information obtained and forwards a third control command to the vehicle. Said third control command can preferably be based on the first control command or on the second control command or correspond thereto. The safety gate serves to monitor the first control command of the artificial-intelligence-based subunit, and ensures that, in the event of an obvious misjudgment of the driving situation by the artificial intelligence, control of the vehicle is undertaken by a deterministically programmed algorithm. This ensures that, in the event of an accident, the circumstances of the accident can be reconstructed. In the majority of driving situations, in which the criticality value moves within a normal, average range, the safety gate will however entrust the control of the vehicle to the artificial intelligence module.

An artificial intelligence module can be a unit which calculates one or more outputs from one or more inputs by means of an internal processing chain having, typically, a group of free parameters. The internal processing chain can be subdivided into interconnected layers which are run through successively during a process from the input to the output. Many artificial intelligence modules are designed to convert an input having a high dimensionality into an output having a significantly lower dimensionality. A standard task of an artificial intelligence module is to allocate images to one or more categories of traffic situations and to interpret these, depending on whether and at which position they contain specific objects. These objects can mark the course of the road, other road users or obstacles on the road or be traffic signs or traffic lights. The output can then, for example, indicate a probability for each of the objects to be determined that the object is represented in the input image, together with information regarding in which region of the environment of the vehicle the object is located and the decision whether and how the vehicle should subsequently react thereto. Thus, a module is referred to as being "intelligent" because it is able to be "trained". The module can be trained by virtue of datasets made up of training data being used. A dataset made up of training data comprises training input data and the corresponding training output data. The training output data of the dataset made up of training data are the result which is expected of the module if the training input data of the same dataset made up of training data is transferred to it as an input. The deviation between this expected result and the result actually produced by the module is recorded and evaluated by means of a "loss function". Said loss function is used as feedback in order to adjust the parameters of the internal processing chain of the module. The result of this training is that with a given, relatively small dataset made up of training data as the "fundamental truth", the module is able to carry out its task, i.e., the classification of images according to which objects they contain easily for a dataset made up of input data, which is larger by many sizes of magnitude. Artificial intelligence modules can be, by way of example, neural networks, genetic algorithms, support vector machines, k-means, Kernel regression or discriminant analysis.

In an embodiment of the invention, the artificial intelligence module is configured to produce at least the first control command for the vehicle from the object data with the aid of a neural network.

A neural network is a specimen example of an internal processing chain of an artificial intelligence module. It consists of a plurality of layers, wherein each layer comprises one or more neurons. Neurons of neighboring layers are connected in such a way that the outputs of a neuron of a first layer are the inputs of one or more neurons in a neighboring second layer. Each such connection is given a "weighting", with which the corresponding input is adopted in an "activation function" which indicates the output of the neuron as a function of its inputs. The activation function is typically a non-linear function of the inputs. For example, the activation function can comprise a "pre-activation function" which is a weighted sum or another linear function of the inputs, and a function forming a threshold or another non-linear function which produces the final output of the neuron from the value of the pre-activation function.

In this embodiment of the invention, neural networks can be used in order to interpret the driving situation on the basis of the received object data and to make a decision regarding the control of the vehicle. The decision-making is based on previous training of the neural network with suitable data which simulate a genuine situation and are intended to prepare the neural network for future genuine decisions which are to be made.

In an embodiment of the invention, in the event of a calculated criticality value above a predefined first threshold, the safety gate is configured to forward the second control command of the fallback apparatus to the vehicle.

If the criticality value is above a predefined first threshold, this indicates a critical driving situation where a collision is possibly imminent. The safety gate recognizes, in this case, a need for action and can either directly block the first control command of the artificial intelligence and change over to the fallback apparatus with the deterministic algorithm. Alternatively, the safety gate first checks whether the reaction by the artificial intelligence is appropriate for the situation, possibly also by comparing the first to the second control command. In the event of an appropriate reaction such as obviously slowing down or a suitable steering intervention, the safety gate in this embodiment of the invention can continue to entrust the control of the vehicle to the artificial intelligence. In the absence of an appropriate reaction by the artificial intelligence to the critical driving situation, the safety gate will however transfer the vehicle control to the fallback apparatus.

In an embodiment of the invention, the safety gate is configured, in the event of a calculated criticality value below a predefined second threshold, to bring about a maneuver in order to terminate an automated driving mode.

If the criticality value is below a predefined second threshold, this indicates an obviously subcritical driving situation such as, by way of example, a speed which is too low and inappropriate for the driving situation or too severe a braking intervention. In this case, the safety gate likewise recognizes a need for action and can either directly block the first control command of the artificial intelligence and change over to the fallback apparatus with the deterministic algorithm. Alternatively, the safety gate first checks whether the reaction by the artificial intelligence is appropriate for the situation, possibly also by comparing the first to the second control command. In the event of an appropriate reaction such as, for instance, accelerating or a less strong braking intervention, the safety gate can continue to entrust the control of the vehicle to the artificial intelligence. In the absence of an appropriate reaction by the artificial intelligence to the subcritical driving situation, the safety gate will, however, transfer the vehicle control to the fallback apparatus. The safety gate in this embodiment of the invention can additionally bring about a maneuver in order to terminate the automated driving mode.

In an embodiment of the invention, the maneuver in order to terminate the automated driving mode is a takeover request to a driver of the vehicle or a minimal-risk maneuver.

In order to terminate the automated driving mode, the control system can request a driver of the vehicle to undertake control of the vehicle. If the driver does not comply with the request, for example within a predefined time interval, the control system can prompt the vehicle to terminate the automated driving mode by a minimal-risk maneuver, in which the vehicle stops by way of example at the next safe position.

In an embodiment of the invention, the detection apparatus is configured to detect the object from the surroundings of the vehicle with the aid of cameras, radar sensors, lidar sensors and/or ultrasonic sensors.

In order to detect the surroundings of the vehicle and the corresponding driving situation, a plurality of different sensor technologies and cameras can be installed in the vehicle, which can scan the surroundings, in this embodiment of the invention, for example by means of optical, acoustic, electromagnetic or further methods, or can record corresponding information.

In an embodiment of the invention, the first control command, the second control command and the third control command are configured to control at least the brake, the steering and/or the drive of the vehicle.

The brake, steering and drive are indicated as the most important functions in terms of controlling a vehicle, especially with respect to control commands for avoiding accidents. Admittedly, other functions of the vehicle can of course also be actuated, for example, by the control commands in this embodiment of the invention such as, by way of example, indicators, the horn or windshield wipers.

In an embodiment of the invention, the safety apparatus is configured to use an ego speed of the vehicle, a speed of an object vehicle, a time until a possible collision, a time until a necessary braking maneuver or a necessary deceleration as calculation values.

In order to calculate the criticality value in this embodiment of the invention, the safety apparatus has recourse to calculation values which are to be simply obtained from the object data. Said calculation values do not, for example, have to be based on an extensive analysis of the driving situation by means of imaging methods, but can advantageously be acquired simply from the data of, by way of example, speed and distance sensors.

A further aspect of the invention comprises a method for controlling a brake, a steering and/or a drive of an autonomous or automated vehicle, wherein the method has the following steps: a first step involves detecting an object from the surroundings of the vehicle and providing corresponding object data. A second step involves producing at least one first control command for the vehicle from the object data with the aid of an artificial intelligence module. A third step involves producing at least one second control command for the vehicle from the object data with the aid of a deterministic calculation rule. A fourth step involves establishing calculation values on the basis of the object data and calculating a criticality value based thereon. In addition, a fifth step involves receiving the first control command, the second control command and the criticality value and sending a third control command based on the criticality value to the vehicle, wherein the third control command is either the first control command of the artificial intelligence module or the second control command of the deterministic calculation rule or corresponds thereto.

The autonomous or automated vehicle is thus controlled in accordance with a method which can be divided into steps. Following the detecting of object data from the surroundings as the first step, steps two, three and four are preferably executed simultaneously. Here, the object data are analyzed in each case and further processed in different ways. In the second step, a first control command is produced by means of artificial intelligence. In the third step, a second control command is produced with the aid of a deterministic calculation rule and, in the fourth step, a criticality value of the driving situation is calculated. In the fifth step, which follows the preferably simultaneous execution of steps two, three and four, a third control command is produced. As a function of the criticality value and, advantageously, also as a function of the first control command and an appropriate reaction of the first control command to the driving situation, the third control command either consists of the first control command or the second control command or corresponds thereto. It should, however, be noted that the sequence of steps indicated here can also be different. In particular, it is not to be understood in a restrictive sense.

In an embodiment of the invention, in the event of a calculated criticality value above a predefined first threshold, the second control command established with the aid of the deterministic calculation rule is forwarded.

In this embodiment of the invention, in the event of a predefined first threshold being fallen short of by the criticality value, the second control command can either be used directly or forwarded in the form of the third control command in order to bring about, for example, an appropriate braking intervention or in order to attain control behavior which can be reconstructed. Alternatively, possibly also by comparing the first and the second control command, the first control command is first checked for plausibility. In this case, a changeover is only made to the second control command in the event of implausible behavior of the first control command. In the event of a first control command which is appropriate for the situation, said first control command is used in order to control the vehicle in the form of the third control command.

A further aspect of the invention comprises a computer program which, if it is run on a processor, prompts a control system in accordance with one of the previously described embodiments to carry out a method in accordance with one of the previously described embodiments.

Further exemplary embodiments of the invention are explained below, with reference to the following drawings:

DETAILED DESCRIPTION OF THE FIGURES

Figure 1:
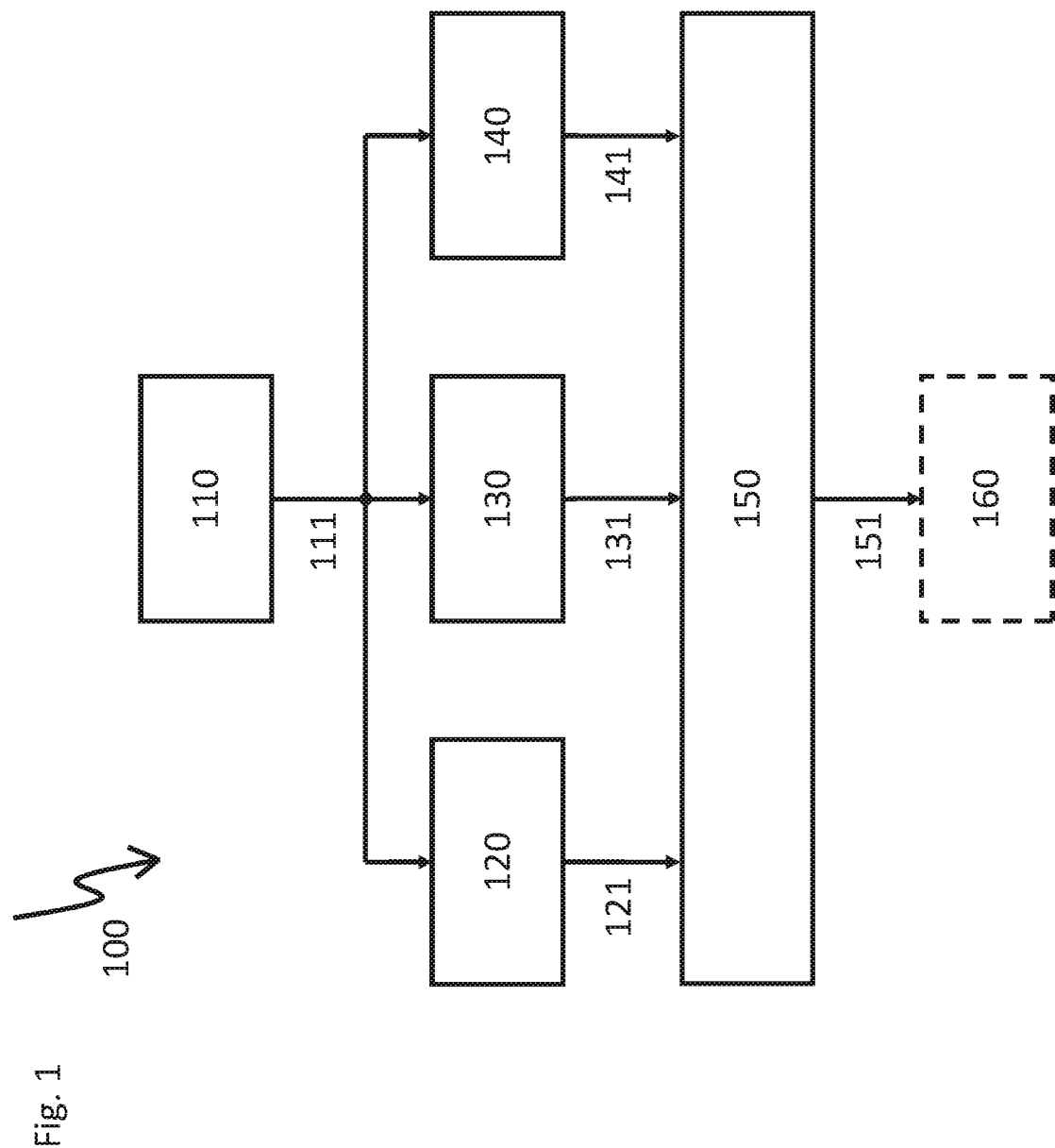
FIG. 1 shows a schematic construction of a control system according to the invention for controlling an autonomous or automated vehicle.

FIG. 1 shows a schematic construction of a control system 100 according to the invention for controlling an autonomous or automated vehicle 160. A detection apparatus 110 is configured to detect objects from the surroundings of the vehicle 160 and to provide corresponding object data 111. These object data 111 are supplied to an artificial intelligence module 120, a fallback apparatus 130 and a safety apparatus 140. The artificial intelligence module 120 produces at least one first control command 121 for controlling the vehicle 160 from the object data 111. The fallback apparatus 130 produces at least one second control command 131 for controlling the vehicle 160 from the object data 111 with the aid of a deterministic calculation rule and the safety apparatus 140 establishes calculation values from the object data 111 and calculates a criticality value 141 therefrom. Said first control command 121, the second control command 131 and the criticality value 141 are forwarded to the safety gate 150. Said safety gate is configured to produce a third control command 151 on the basis of the criticality value 141, wherein the third control command 151 is either the first control command 121 of the artificial intelligence module 120 or the second control command 131 of the fallback apparatus 130 or corresponds thereto or is based thereon. The monitoring of the first control command 121 of the artificial intelligence module 120 having the possibility of recourse to the second control command 131 of the deterministically programmed fallback apparatus 130 serves to guarantee an appropriate reaction of the control system 100 of the vehicle 160 to critical driving situations or, in the event of an accident, the possibility of reconstructing the circumstances of the accident as well as clarifying the question of fault.

Figure 2:
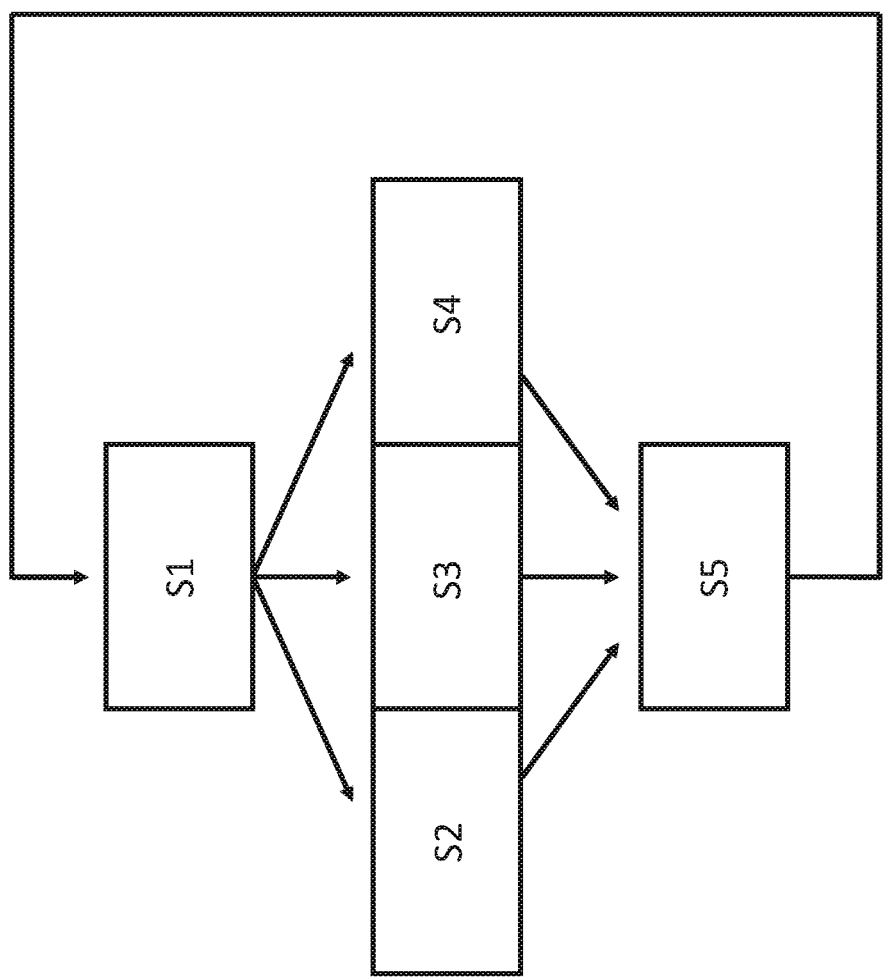
FIG. 2 shows a block diagram of a method according to the invention for controlling an autonomous or automated vehicle.

FIG. 2 shows a block diagram of a method according to the invention for controlling an autonomous or automated vehicle 160. A first step S1 of detecting an object from the surroundings of the vehicle 160 and providing corresponding object data 111 is followed by steps S2, S3 and S4 which are preferably executed simultaneously. In the second step S2, at least one first control command 121 is produced for the vehicle 160 with the aid of an artificial intelligence module 120. In the third step S3, at least one second control command 131 is produced for the vehicle 160 with the aid of a deterministic calculation rule. In the fourth step S4, calculation values are established on the basis of the object data 111 and a criticality value 141 based thereon is calculated. In the fifth step S5, which follows steps S2, S3 and S4 which are preferably executed simultaneously, the first control command 121, the second control command 131 and the criticality value 141 are received and a third control command 151 based on the criticality value 141 is sent to the vehicle 160, wherein the third control command 151 is either the first control command 121 of the artificial intelligence module 120 or the second control command 131 of the deterministic calculation rule or corresponds thereto.

In addition, it is pointed out that "comprising" does not exclude any other elements or steps and the indefinite article "a" does not exclude a plurality. It is additionally pointed out that features or steps, which have been described with reference to one of the above exemplary embodiments, can also be used in combination with other features or steps of other exemplary embodiments described above. Reference numerals in the claims are not to be deemed to be restrictions.

LIST OF REFERENCE NUMERALS

100 Control system
110 Detection apparatus
111 Object data
120 Artificial intelligence module
121 First control command
130 Fallback apparatus
131 Second control command
140 Safety apparatus
141 Criticality value
150 Safety gate
151 Third control command
160 Vehicle

The invention claimed is:

1. A control system for controlling a brake, a steering and/or a drive of an autonomous or automated vehicle, the control system having:
   a detection apparatus which is configured to detect an object from the surroundings of the vehicle and to provide corresponding object data;
   an artificial intelligence module which is configured to produce at least one first control command for the vehicle from the object data;
   a fallback apparatus which is configured to produce at least one second control command for the vehicle from the object data with the aid of a deterministic calculation rule;
   a safety apparatus which is configured to establish calculation values on the basis of the object data and to calculate a criticality value therefrom; and
   a safety gate which is configured to receive the first control command of the artificial intelligence module, the second control command of the fallback apparatus and the criticality value of the safety apparatus,
wherein the safety gate is configured to send a third control command to the vehicle on the basis of the criticality value, wherein the third control command is either the first control command of the artificial intelligence module or the second control command of the fallback apparatus or corresponds thereto.

2. The control system according to claim 1, wherein the artificial intelligence module is configured to produce at least the first control command for the vehicle from the object data with the aid of a neural network.

3. The control system according to claim 1, wherein the safety gate is configured, in the event of a calculated criticality value above a predefined first threshold, to forward the second control command of the fallback apparatus to the vehicle.

4. The control system according to claim 1, wherein the safety gate is configured, in the event of a calculated criticality value below a predefined second threshold, to bring about a maneuver in order to terminate an automated driving mode.

5. The control system according to claim 4, wherein the maneuver in order to terminate the automated driving mode is a takeover request to a driver of the vehicle or a minimal-risk maneuver.

6. The control system according to claim 1, wherein the detection apparatus is configured to detect the object from the surroundings of the vehicle with the aid of cameras, radar sensors, lidar sensors and/or ultrasonic sensors.

7. The control system according to claim 1, wherein the first control command, the second control command and the third control command are configured to control at least the brake, the steering and/or the drive of the vehicle.

8. The control system according to claim 1, wherein the safety apparatus is configured to use an ego speed of the vehicle, a speed of an object vehicle, a time until a possible collision, a time until a necessary braking maneuver or a necessary deceleration as calculation values.

9. A method for controlling a brake, a steering and/or a drive of an autonomous or automated vehicle, the method having the steps of:
   detecting an object from the surroundings of the vehicle and providing corresponding object data,
   producing at least one first control command for the vehicle from the object data with the aid of an artificial intelligence module,
   producing at least one second control command for the vehicle from the object data with the aid of a deterministic calculation rule,
   establishing calculation values on the basis of the object data and calculating a criticality value based thereon, and
   receiving the first control command, the second control command and the criticality value and sending a third control command based on the criticality value to the vehicle, wherein the third control command is either the first control command of the artificial intelligence module or the second control command of the deterministic calculation rule or corresponds thereto.

10. The method according to claim 9, wherein, in the event of a calculated criticality value above a predefined first threshold, the second control command established with the aid of the deterministic calculation rule is forwarded.

11. A computer program which, when executed on a processor, causes the method according to claim 9 to be performed.

* * * * *